United States Patent [19]

Hayashi

[11] Patent Number: 4,734,605
[45] Date of Patent: Mar. 29, 1988

[54] LINEAR DRIVING MECHANISM

[75] Inventor: Sokichi Hayashi, Iida, Japan

[73] Assignee: Tamagawa Seiki Kabushiki Kaisha, Tokyo, Japan

[21] Appl. No.: 907,592

[22] Filed: Sep. 15, 1986

[51] Int. Cl.$^4$ .............................................. H02K 7/06
[52] U.S. Cl. ........................................ 310/80; 310/83
[58] Field of Search ..................... 310/80, 83, 12, 49

[56] References Cited

U.S. PATENT DOCUMENTS

| | | | |
|---|---|---|---|
| 3,777,587 | 12/1973 | Hoshina | 310/80 X |
| 3,824,420 | 7/1974 | Stegeman et al. | 310/80 X |
| 3,898,487 | 8/1975 | Sobiepanek | 310/80 |
| 4,066,922 | 1/1978 | Hennemann | 310/80 |
| 4,145,165 | 3/1979 | Perkins | 310/80 X |
| 4,553,056 | 11/1985 | Pfister | 310/80 |

OTHER PUBLICATIONS

*THK Catalog*, 5/10/86.

*Primary Examiner*—Donovan F. Duggan
*Attorney, Agent, or Firm*—Brooks Haidt Haffner & Delahunty

[57] ABSTRACT

A linear driving mechanism of the present invention is disclosed in which a guide member is mounted to a frame, a guide axis is fixedly mounted to said frame and has a threaded portion thereon a rotor movably mounted to said guide axis along said threaded portion, a stator mounted to the outside of said rotor through a bearing means, a movable table which mounted to said stator and mounted to reciprocate along said guide member. According to the present invention, said movable table is linearly reciprocated along said guide member by rotating said rotor.

4 Claims, 4 Drawing Figures

FIG. I
(PRIOR ART)
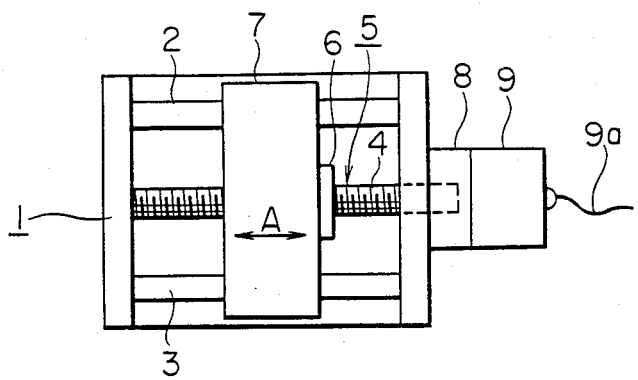
FIG. 2
(PRIOR ART)
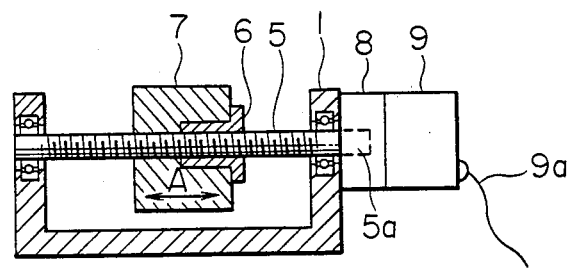
FIG. 3
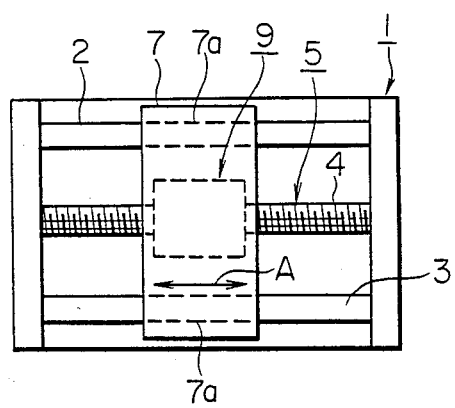
FIG. 4
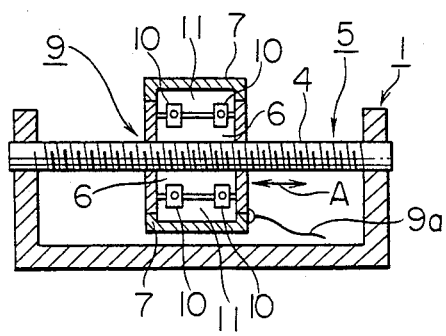

LINEAR DRIVING MECHANISM

BACKGROUND OF THE INVENTION

This invention relates to a linear driving mechanism using a rotary means, more particularly to a novel improvement for obtaining a very compact, highly reliable construction for a linear driving mechanism.

Conventionally, there have been many kinds of linear driving mechanisms having said rotary means. FIGS. 1 and 2 are showing a representative construction in the prior art.

In the constructions shown in FIGS. 1 and 2, a pair of bar shaped guide members 2 and 3 are fixed across a U-shaped frame 1. Further, a guide axis 5 having a threaded portion 4 is rotatably mounted between said guide members 2 and 3.

A nut member 6 is thredably engaged with the outer surface of said guide axis 5 through said threaded portion 4, a movable table member 7 being unitarity mounted to said nut member 6.

One end portion 5a of said guide axis 5 protrudes through an outer portion of said frame 1 through a part of said frame 1, said one end portion 5a of said guide axis 5 being connected with a joint member 8 that is mounted to said frame 1. A solenoid motor 9 is connected with said joint member 8 for rotatably moving said guide axis 5.

In said construction above, power from a power source, not shown, is supplied to said solenoid motor 9 via a power supply lead wire 9a, which then drives said guide axis 5 to rotate through said joint member 8, said movable table member 7 being reciprocally moved in the direction of an arrow A via said nut member 6.

However, in the above noted conventional construction, since said guide axis 5 is rotated by said joint member 8 and said solenoid motor 9 which are mounted to the outer portion of said frame 1 as means for reciprocally moving said movable table member 7, it is necessary to provide suitable space for mounting said joint member 8 and said solenoid motor 9 to said frame 1 as a linear driving mechanism.

Furthermore, since it is necessary to provide said joint member for connecting said guide axis 5 and said solenoid motor 9, there is a cost-problem over and above said space problem.

Therefore, this can not meet the requirements of users calling for linear driving mechanism as compact as possible and such a construction is the biggest hurdle to constructing small and compact automatic mechanisms such as computer drafting machines and robot mechanisms which use said linear driving mechanism.

SUMMARY OF THE INVENTION

It is a principal object of the present invention to provide a means highly effective to overcome the aforementioned problems of the prior art device. In order to accomplish the object, the present invention provides a linear driving mechanism in which a guide member is mounted to a frame: a guide axis which has a threaded portion and which is mounted to said frame; a rotor is movably mounted to said guide axis by a threaded portion thereof; a stator is mounted to the outer surface of said rotor via a plurality of bearing members; and a movable table is mounted to said stator and guided by said guide member. According to the present invention, said movable table is linearly and reciprocally moved along said guide member by rotating said rotor, whereby a driving means for said movable table is enclosed in said frame completely.

BRIEF DESCRIPTION OF THE DRAWINGS

The object and advantages of the present invention will become more apparent from reading the following detailed description in connection with the accompanying drawings, in which:

FIG. 1 shows a plan view of a linear driving mechanism of the prior art;

FIG. 2 shows a sectional view of a linear driving mechanism of the prior art;

FIG. 3 shows a plan view of a linear driving mechanism of the present invention; and FIG. 4 shows a sectional view of a linear driving mechanism of the present invention.

DESCRIPTION OF THE PREFERRED EMBODIMENTS

A linear driving mechanism according to the present invention is hereinafter described in reference to the accompanying drawings.

In the following detailed description, one and the same numerals are used for the same or equivalent portions in the aforementioned prior art.

In the drawings, numeral 1 is a frame formed whch is in cross section of a U-shape, a pair of bar type guide members 2 and 3 are fixedly mounted to said frame 1, and further a guide axis 5 having a threaded portion 4 is rotatably mounted between said guide members 2 and 3.

A rotor 6 is rotatably mounted to an outer portion of said threaded portion 4 of said guide axis 5, a ring shaped stator 11 is positioned around the outer periphery portion of said rotor 6 via a plurality of bearing members 10, a solenoid motor 9 being composed by said rotor 6 and stator 11.

Further, a long type movable table 7 is mounted to an outer peripheral portion of said stator 11, a pair of said guide members 2 and 3 passing through a pair of guide holes 7a being formed at both end portions of said movable table 7. Therefore, said movable table 2 is reciprocally movable in the direction indicated by arrow "A" along said guide members 2 and 3 without rotating.

A power supply lead wire 9a is connected with said solenoid motor 9, a power source being supplied to said solenoid motor 9 via said power supply lead wire 9a.

In the above noted construction, the operation of the linear driving mechanism according to the present invention will now be referred to:

When the power source is supplied to said solenoid motor 9 via said power supply lead wire 9a, said rotor 6 is rotated in the clockwise or counterclockwise direction and to reciprocate in the direction of arrow "A" with a rotary operation, i.e. along the axial direction of said guide axis 5. Therefore, said rotary movement of said rotor 6 is transmitted to said stator 11 and said movable table 7 via said bearing members 10, whereby said movable table 7 is reciprocated in the direction of arrow "A".

Furthermore, in the above noted description, said solenoid motor 9 is used as a rotary means for reciprocating said movable table 7, but the same effect can be obtained by an air-motor, hydro motor or construction other than said solenoid motor.

According to the present invention, the following effects can be accomplished:

A very compact form can be constructed since the rotary means such as a solenoid motor is enclosed in the frame with nothing protruding outside of said frame 1, in contrast to the prior art.

Furthermore, a linear driving mechanism can be constructed using a smaller number of parts and at a lower cost since there is no need to use a joint member such as in the aforementioned prior art.

What is claimed is:

1. A linear driving mechanism comprising in combination:

guide means mounted to a frame;
   a guide axis which is stationary with respect to said frame and which has a threaded portion;
   a rotor movably mounted with respect to said guide axis on said threaded portion;
   a stator mounted to the outside of said rotor via a bearing member;
   a movable table which is mounted to said stator and reciprocally movably mounted and supported on said guide means to reciprocate along said guide;
   whereby said movable table is reciprocally movable linearly by rotating said rotor.

2. A linear driving mechanism as claimed in claim 1, where said guide means is a pair of guide members.

3. A linear driving mechanism as claimed in claim 1, where said rotor is driven by a solenoid means.

4. A linear driving mechanism as claimed in claim 1, where said rotor is driven by an air or hydro driving means.

* * * * *